(12) United States Patent
Dooley

(10) Patent No.: US 11,391,025 B2
(45) Date of Patent: Jul. 19, 2022

(54) SINK DRAIN AID

(71) Applicant: Jackson C Dooley, St Davids, PA (US)

(72) Inventor: Jackson C Dooley, St Davids, PA (US)

(*) Notice: Subject to any disclaimer, the term of this patent is extended or adjusted under 35 U.S.C. 154(b) by 0 days.

(21) Appl. No.: 17/091,801

(22) Filed: Nov. 6, 2020

(65) Prior Publication Data

US 2021/0054606 A1 Feb. 25, 2021

Related U.S. Application Data

(62) Division of application No. 16/423,340, filed on May 28, 2019, now abandoned.

(60) Provisional application No. 62/678,026, filed on May 30, 2018.

(51) Int. Cl.
*E03C 1/262* (2006.01)
*A47K 1/08* (2006.01)
*F16B 47/00* (2006.01)

(52) U.S. Cl.
CPC .............. *E03C 1/262* (2013.01); *A47K 1/08* (2013.01); *F16B 47/00* (2013.01)

(58) Field of Classification Search
CPC .. F16B 47/00; A47G 1/17; A47K 1/08; A47K 10/12; A47K 10/14; A47K 2201/00; A47K 2201/02; A47K 2201/025; E03C 1/262; A46B 15/0097; A46B 2200/405; A45D 27/46
See application file for complete search history.

(56) References Cited

U.S. PATENT DOCUMENTS

| | | | |
|---|---|---|---|
| 1,372,412 A * | 3/1921 | Finkhousen | A47K 7/06 15/160 |
| 2,051,068 A * | 8/1936 | Ayre | A47K 10/14 248/205.5 |
| 2,145,142 A | 1/1939 | William | |
| 4,945,598 A * | 8/1990 | Racioppi | A45D 27/29 15/160 |
| D322,554 S | 12/1991 | Amussen | |
| 5,217,123 A * | 6/1993 | Riley | A47K 10/08 211/105.1 |
| 6,732,385 B1 * | 5/2004 | Henderson | A47K 1/14 4/295 |
| 2004/0177463 A1 * | 9/2004 | Takeda | A46B 9/04 15/167.1 |
| 2012/0124724 A1 * | 5/2012 | LaPointe | E03C 1/266 4/295 |

FOREIGN PATENT DOCUMENTS

| | | | |
|---|---|---|---|
| CN | 2152485 Y | * | 1/1994 |
| JP | H11299688 A | * | 11/1999 |
| KR | 20140006006 U | * | 12/2014 |
| WO | 9002497 A1 | | 3/1990 |
| WO | 2009131448 A1 | | 10/1990 |

OTHER PUBLICATIONS

Non Final Office Action issued in U.S. Appl. No. 16/423,340 dated Jul. 13, 2020, 7 pages.

* cited by examiner

*Primary Examiner* — Erin Deery

(74) *Attorney, Agent, or Firm* — Schott, P.C.

(57) ABSTRACT

A method for removing a sink drain stopper includes providing a sink drain aid including a handle and a suction cup connected to the handle; engaging the sink drain aid suction cup to a sink stopper; and pulling on the handle to remove the sink drain stopper. A device to perform the method includes the sink drain aid described.

5 Claims, 5 Drawing Sheets

SINK DRAIN AID

BACKGROUND

A sink stopper normally sits at the bottom of the sink in a state of rest, ignored by people using the sink. But in the moments when the water flow slows and or the stopper drops so low that it slows water from draining from the sink, a person will want to raise the stopper either partially or fully.

In that moment, a person may press the stopper lift rod that usually protrudes from the back of a faucet. Depending on how the sink was set up, this may or may not raise the stopper. In all likelihood, unless the lift rod assembly was recently adjusted, this will not lift the stopper. When this happens, the person's options are more limited. If they are enterprising and handy, they can adjust the lift rod assembly themselves, or crawl under their sink and manually "pop" up the stopper from below by pushing up a pivot rod. Or they can reach through the dirty water in the sink and attempt to pry up the stopper with a thin blade, which could puncture the gasket or damage the blade, sink, or stopper. All of these approaches are suboptimal and yet this remains a nearly universal challenge.

Even when not stuck in the closed position, stopper removal can be a challenge and may require contact between a person's hands and whatever may have formed or grown on an underside of the stopper and gasket.

A need thus exists for a device to aid people in in the removal of the stopper.

SUMMARY OF THE EMBODIMENTS

A method for removing a sink drain stopper includes providing a sink drain aid including a handle and a suction cup connected to the handle; engaging the sink drain aid suction cup to a sink stopper; and pulling on the handle to remove the sink drain stopper.

DETAILED DESCRIPTION OF THE EMBODIMENTS

Figure 1:
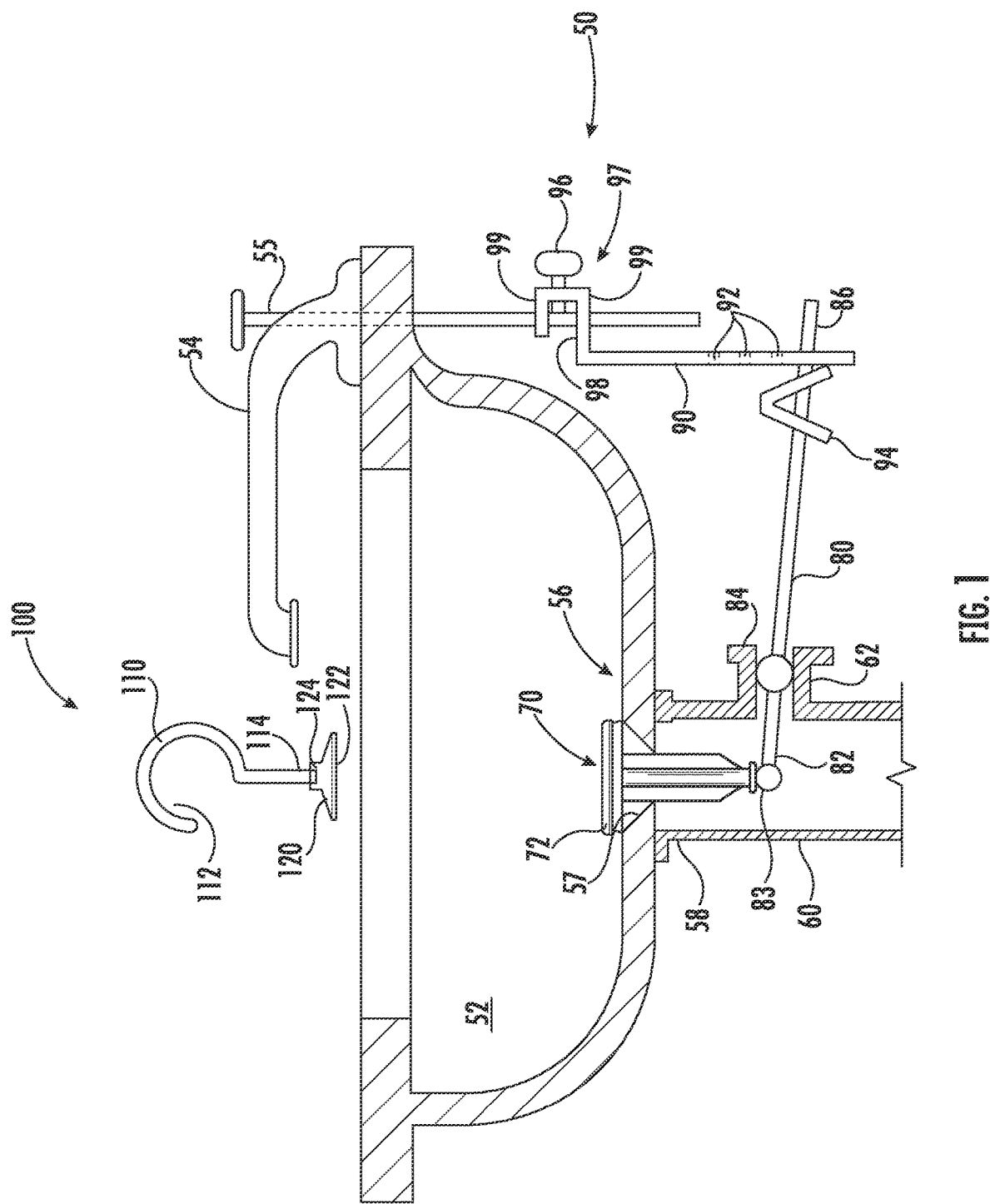
FIG. 1 shows the sink drain aid in an environment.
Figure 2A:
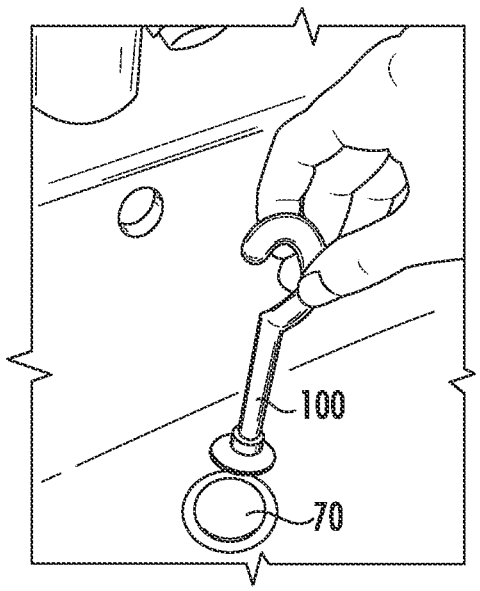
FIGS. 2A-2D show the sink drain aid in a sequence of steps in use.
Figure 2B:
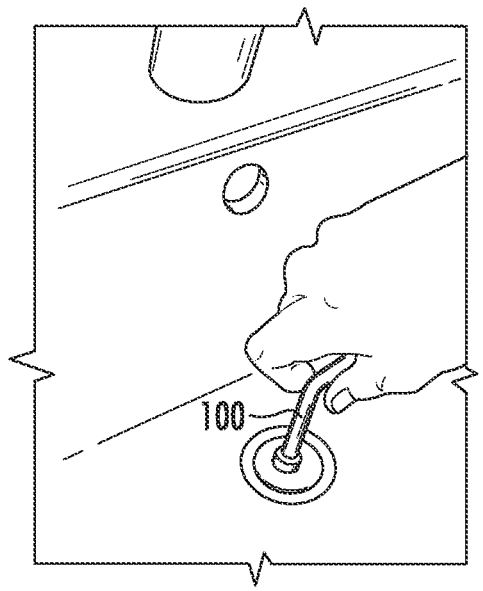
Figure 2C:
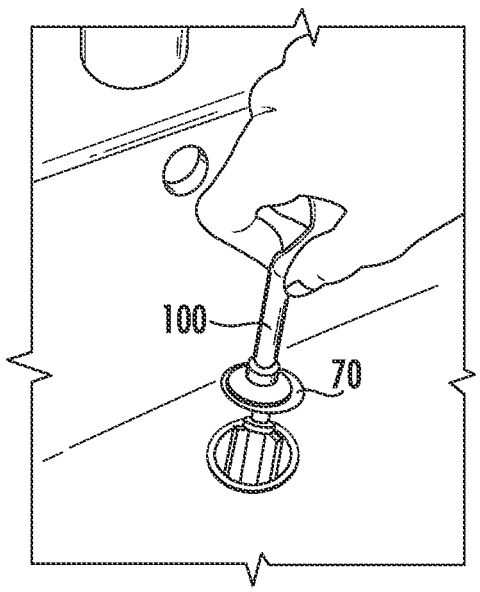
Figure 2D:
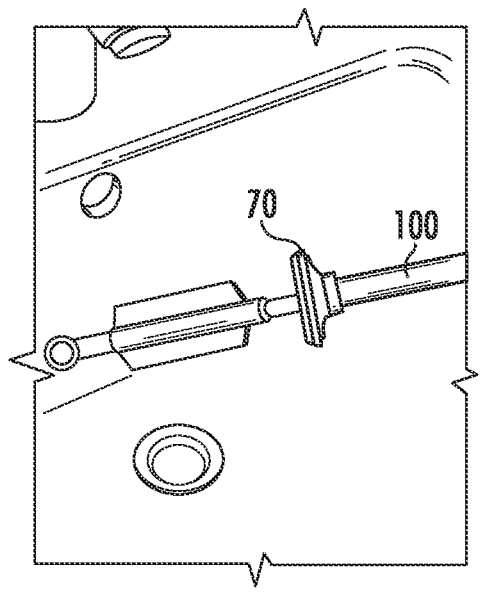

FIG. 1 shows an illustration of the invention in use with a traditional sink 50. Before introducing the sink drain aid 100, we will describe the operation of the sink 50. A traditional sink 50, such as that typically found in a residential bathroom includes a bowl 52, faucet 54, and drain 56. In normal use, water passes through the faucet 54 into the bowl 52 and drains from the bowl 42 through the drain 56 into the tail piece drain 60, which through a trap and other drainage pipes, eventually connects into a sewer, the ultimate piping destination for the sink waste.

The tail piece 60 connects to the sink bowl 52 through a flange 58, which generally includes male threading attached to the bowl 52 and female threading in the flange 58, along with a sealed engagement between the flange 58 and tail piece 60.

The drain 56 and tail piece 60 contain the stopper 70. The stopper 70 has two familiar positions. As shown in FIG. 1, the first position is the open position, which for most sinks 50, is the rest position. The second position is a closed position, in which a person (or the force/weight of the water in the bowl 52, or merely the slow action of bumps, weight of water, and time) lowers the stopper 70 until its sealing gasket 72, which is slightly larger than a portion 57 of the drain 56, engages the drain 56 and prevents the flow of water through therethrough.

The action of several other parts of the sink assembly assists in raising and lowering the stopper 70. At rest, the stopper 70 sits on a stopper-engaging end 82 of a pivot rod 80, or a nut 83 at the end of the pivot rod 80. The pivot rod 80 pivots on a pivot ball 84 that is sealed (sealing not shown) within the tail piece 60 pivot port 62. The pivot rod 80 has a Clovis engagement end 86 that extends through one of several holes 92 in a Clovis strap 90. (Note: Although the Clovis strap 90 includes the name "strap" within it, it is generally made from a thin corrosive resistant material like aluminum.)

The Clovis strap 90 and pivot rod 80 engage one another through both one of the several holes 92 and also the spring clip 94. A manual adjustment to each of these, as well as the Clovis screw 96 usually allows for easy stopper manipulation—for a time.

The Clovis strap 90 includes a faucet stopper rod engagement end 97 with an engagement head 98 including holes 99 therethrough for engaging a faucet stopper rod 55.

When perfectly adjusted, movement of the faucet stopper rod 55 up and down acts on the Clovis strap 90, which in turn moves the pivot rod 80, which raises and lowers the stopper 70. Misalignment may occur when any of the aforementioned many parts self-adjusts, which can result in the stopper 70 being stuck in the closed position.

When this happens, a person may use the sink drain aid 100. The sink drain aid 100 includes a handle body 110 and suction cup 120. The engagement body 110 includes a handle 112 (currently shown as a hook, although other shapes are possible) and a suction cup engagement end 114. The handle's engagement end 114 engages the suction cup 120 at a suction cup engagement end 124, through threading (male on the suction cup engagement end 114) or other suitable water corrosion resistant means. The suction cup 120 includes a convex flexible cup 122 that functions as a common suction cup and must be sized smaller than the stopper 70 to which it will be applied to be effective. The suction cup may be of different sizes, but through experimentation, the inventors have found that a 1.25-inch cup in diameter works for a wide variety of stoppers 70.

In use, a person holds the handle 110 which may be in a semi-circular shape, and extends it through the water (or not) in the sink bowl 52, aligning the suction cup 120 and over the stopper 70. Once aligned, the person presses the suction cup 120 onto the stopper 70 until they are engaged. At this point, merely drawing the sink drain aid 100 upwards by its handle 110 also pulls the stopper 70 upwards. FIGS. 2A, 2B, 2C, and 2D show the sequence of the stopper 70 removal using the sink drain aid 100 steps.

The handle may be of a water and corrosion resistant plastic such as polyethylene, polypropylene, polyvinyl chloride, polypropylene, polycarbonate, acrylic, or ABS, though this list is not exclusive of other material choices that would not decay with repeated exposure to moisture.

Figure 3A:
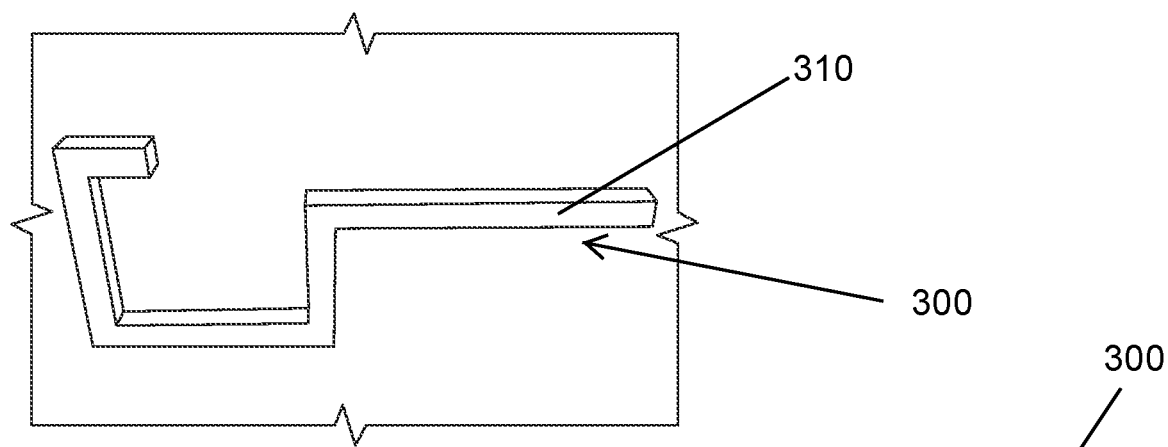
FIGS. 3A-3C and 4A-4C show different embodiments of the sink drain aid.
Figure 3B:
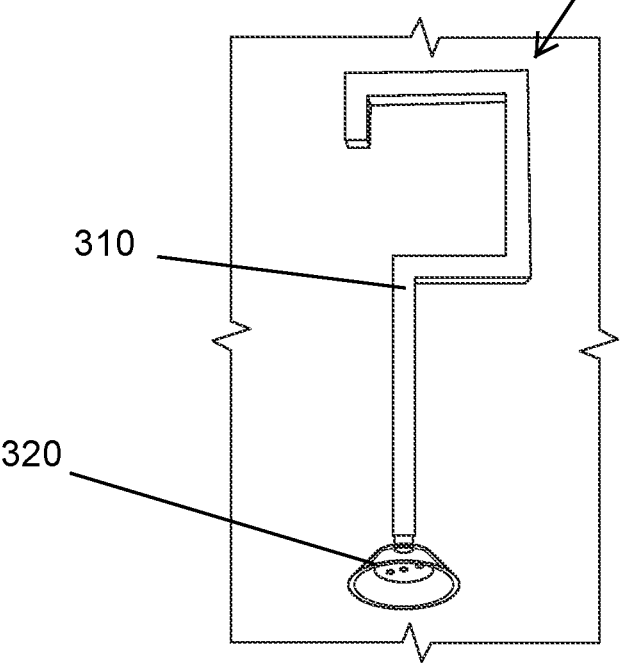
Figure 3C:
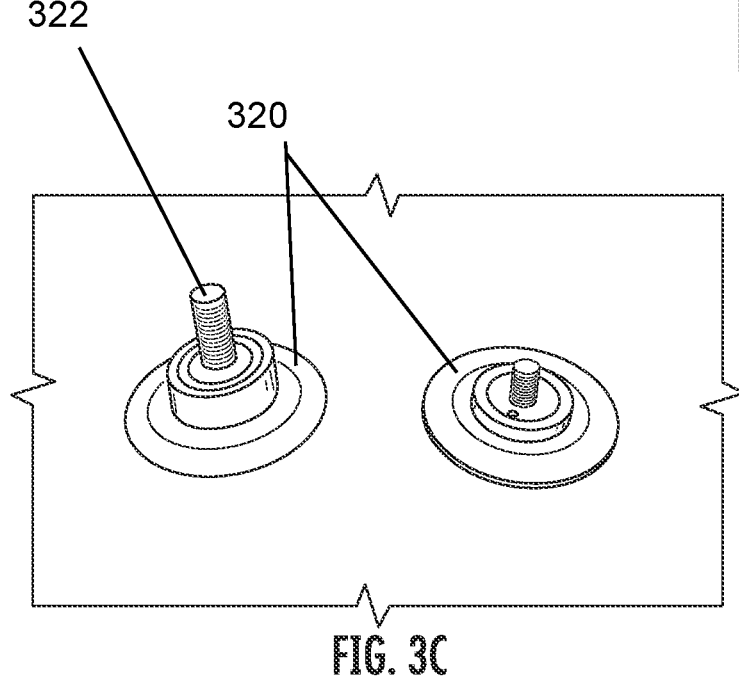

FIGS. 3A-3C show an alternate embodiment of the sink drain aid 300 in which the cross section through the handle 310 is rectangular (square as shown). The aid handle 310 may engage the suction cup 320 via male threading 322 on the suction cup 320 into female threading on the aid handle 310.

Figure 4A:
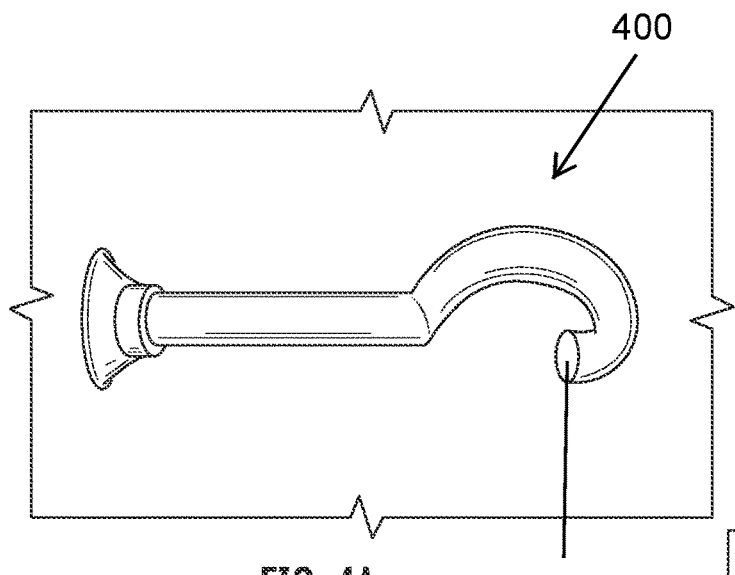
Figure 4B:
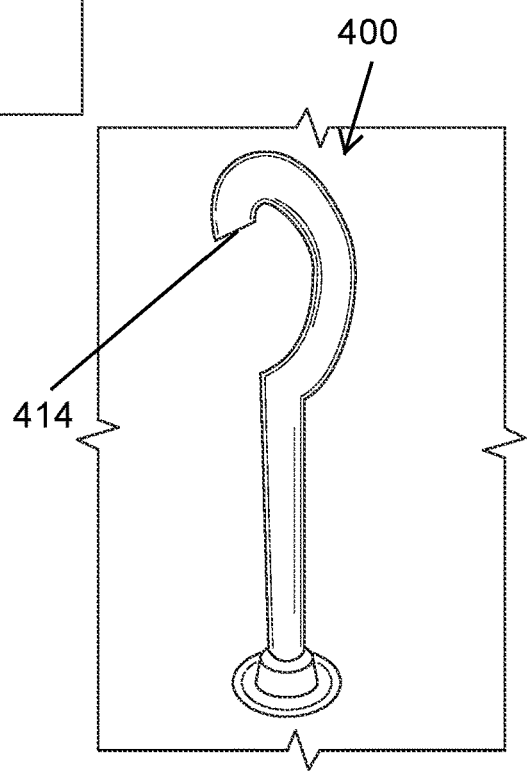
Figure 4C:
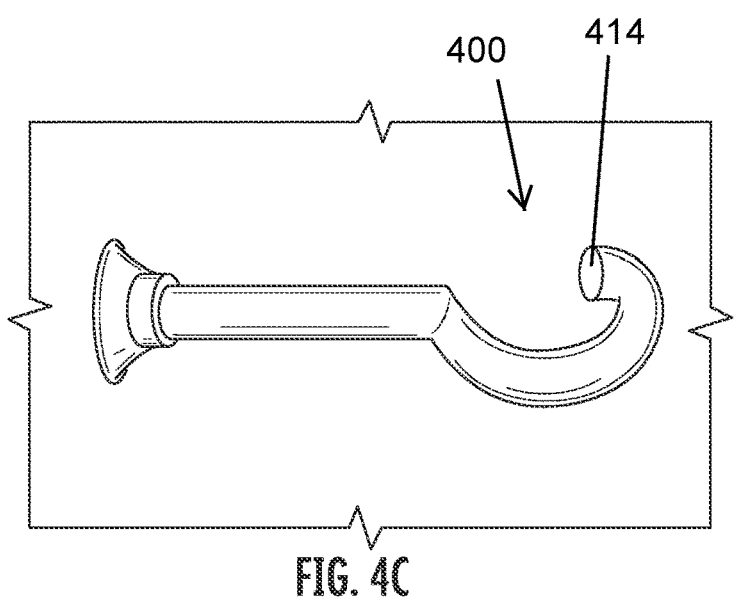

The sink drain aid 100 may also be in the form shown in FIG. 1, or other forms as a sink drain aid 400 shown in FIGS. 4A-4C with a terminal handle end 414 that turns inwards on itself such that it better engages items hung therefrom and a person's hand in use. The handle can also come in other forms, with a bulbous or even just a straight end.

Figure 5:
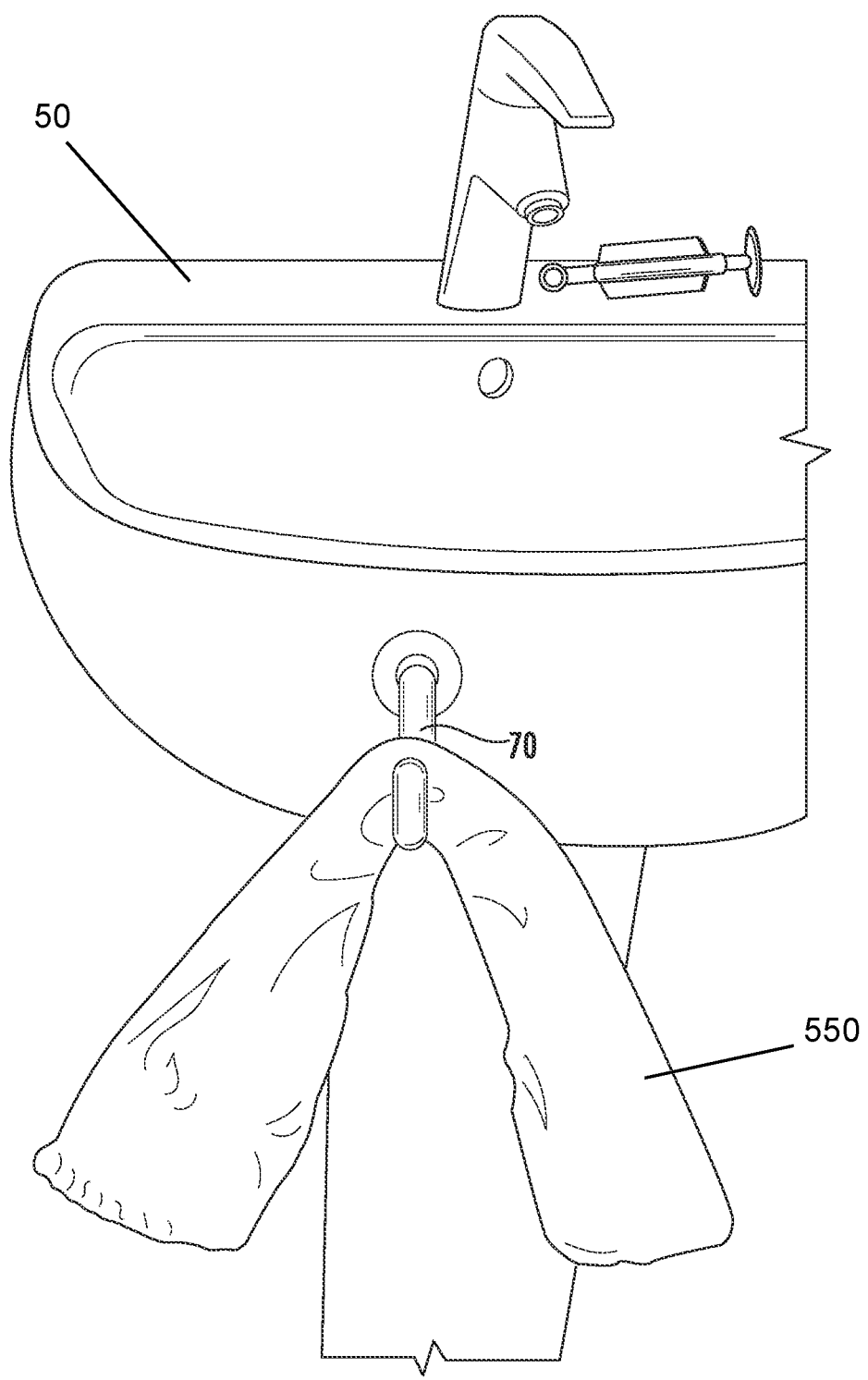
FIG. 5 shows the sink drain aid used in a second manner.

As shown in FIG. 5, the sink drain aid 100 may be stored (using the suction cup 120) against the side of the sink 50 or other surface and function as a towel 550 holder or serve other purposes as it protrudes from a surface.

While the invention has been described with reference to the embodiments above, a person of ordinary skill in the art would understand that various changes or modifications may be made thereto without departing from the scope of the claims.

The invention claimed is:

1. A method comprising the steps of:
   providing a sink drain aid, the sink drain aid including a handle and a suction cup connected to the handle;
   engaging the sink drain aid to a sink drain stopper using the suction cup;
   pulling on the handle to remove the sink drain stopper from a sink;
   attaching the sink drain aid to a different portion of the sink using the suction cup; and
   hanging a towel from the handle.

2. The method of claim 1, wherein the sink drain aid further comprises a threaded engagement between the handle and the suction cup.

3. The method of claim 1, wherein the handle has a semi-circular shape.

4. The method of claim 1, wherein the handle has a circular cross-section.

5. The method of claim 1, wherein the handle has a rectangular cross-section.

* * * * *